Patented Apr. 15, 1930

1,754,670

UNITED STATES PATENT OFFICE

JAMES B. CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

ARTIFICIAL FLOWER AND METHOD OF MAKING SAME

No Drawing. Application filed December 24, 1927. Serial No. 242,526.

This invention relates to a new and improved method of manufacture of artificial flowers particularly such as are made from rubber or rubber compounds.

For many years attempts have been made to produce artificial flowers in large part from rubber, but no marked success has been obtained in producing a substantially good imitation of the natural article by relatively inexpensive methods. Either the work involved in producing a realistic imitation has been so great that the price has been prohibitive, or the flowers produced by the ordinary rubber factory methods have been so poorly representative of the natural formations, colors and tints of the genuine article that no public demand has arisen.

It is one of the objects of the present invention to produce by extremely inexpensive methods and without expensive equipment the petals, leaves or other parts which enter into the composition of an artificial flower, which shall quite accurately imitate the shape, appearance and feel of the corresponding parts of the natural article.

In carrying out this object, I take milled or calendered sheet rubber of the pure gum or compounded type, with or without coloring matter, but mixed with the usual vulcanizing ingredients such as sulphur and zinc oxide, and to which has been added an ultra accelerator active at low temperatures. The rubber stock of desired thickness is laid on impressions or forms made of wood, clay or other suitable material made from the natural leaf or petal or shaped to simulate the natural leaf or petal desired, and allowed to vulcanize in applied position at normal or slightly elevated temperatures and atmospheric pressure. The rubber sheet thus takes and retains the shape of the form.

The sheet is cured at low temperature and atmospheric pressure as above described, either on a form if it is desired to make the leaf in any particular shape, or on a plate if no special shape is desired. The leaves or petals are cut to the desired size and shape either before or after the vulcanizing and forming operation.

It will be seen that by taking any suitable sheet rubber compounded with an ultra accelerator active at low temperature, and when uncured or only partly cured, placing it on an inexpensive form of the desired shape or impression which simulates the shape or impression of the natural leaf or petal, and allowing the sheet to completely cure at normal or slightly elevated temperature under atmospheric pressure, a wide variety of forms and shapes may be secured without expensive molds, presses and equipment.

Furthermore, the unnatural surface shine or gloss produced when curing at high temperatures under pressure is avoided, and dyes and colors used which would be destroyed by the heats employed in ordinary methods. Generally speaking, temperatures up to 150° F. may be employed, and in practice would not ordinarily be elevated to a point exceeding 212° F.

After the leaves or petals have been produced as above described, they may if desired be further colored by dipping, or according to any of various suitable methods, either before or after assembly.

Reference is made to my co-pending applications for improvements in artificial flowers and method of making same, Serial No. 253,797, filed February 13th, 1928, and Serial No. 253,798, filed February 13, 1928.

Having described the invention, what I claim as new is:

1. The method of producing leaves, petals or other parts for use in the manufacture of artificial flowers, which consists of laying a sheet of previously formed rubber containing vulcanizing agents and an ultra accelerator on to a suitably shaped impression or form and vulcanizing the same in applied position at normal or slightly elevated temperatures and atmospheric pressure.

2. The method of producing leaves, petals or other parts for use in the manufacture of artificial flowers, which consists of making a form to simulate the shape of a natural leaf, petal or other part, laying on said form a piece of previously sheeted rubber stock containing vulcanizing agents and an ultra accelerator, and vulcanizing the same in applied position at normal or slightly elevated temperatures and atmospheric pressure.

3. The method of producing leaves, petals or other parts for use in the manufacture of artificial flowers, which consists of making a form to simulate the shape of a natural leaf, petal or other part, laying on said form a piece of previously sheeted rubber stock containing vulcanizing agents and an ultra accelerator, and vulcanizing the same in applied position at normal or slightly elevated temperatures and atmospheric pressure, and reproducing the shape of the form in the vulcanized stock.

4. The method of producing leaves, petals or other parts for use in the manufacture of artificial flowers, which consists of taking an impression in mouldable material of the part to be reproduced, laying a piece of previously sheeted rubber stock containing vulcanizing agents and an ultra accelerator on said impression and vulcanizing the same in applied position at normal or slightly elevated temperatures and atmospheric pressure to reproduce and retain the impression.

5. The method of producing components of artificial flowers which consists in making a mold using the natural piece to be reproduced, sheeting rubber stock with vulcanizing agents and an ultra accelerator included, applying the sheeted rubber stock to the form, vulcanizing the same at normal or slightly elevated temperatures and atmospheric pressure, and cutting the edges of the sheet either before or after the vulcanizing operation.

6. The method of producing leaves, petals or other parts for use in the manufacture of artificial flowers, which consists of laying a piece of previously sheeted rubber stock containing dyes or coloring matter, vulcanizing agents and an ultra accelerator on to a suitably shaped impression or form and vulcanizing the same in applied position at low temperature and atmospheric pressure.

7. Artificial flowers made in large part from previously formed rubber sheet stock which has been compounded with an ultra accelerator and is subsequently vulcanized at low temperature and atmospheric pressure.

JAMES B. CROCKETT.